(12) United States Patent
Shanker et al.

(10) Patent No.: US 9,512,925 B2
(45) Date of Patent: Dec. 6, 2016

(54) MANUAL BALANCING VALVE

(75) Inventors: Uma Shanker, Noida (IN); Priyank Garg, Noida (IN); George Mathews, Noida (IN); Gaurav Singla, Noida (IN)

(73) Assignee: ADVANCE VALVES PVT. LTD., New Delhi (IN)

( * ) Notice: Subject to any disclaimer, the term of this patent is extended or adjusted under 35 U.S.C. 154(b) by 213 days.

(21) Appl. No.: 14/122,863

(22) PCT Filed: Jun. 4, 2012

(86) PCT No.: PCT/IN2012/000388
§ 371 (c)(1),
(2), (4) Date: Nov. 27, 2013

(87) PCT Pub. No.: WO2012/164586
PCT Pub. Date: Dec. 6, 2012

(65) Prior Publication Data
US 2014/0175316 A1    Jun. 26, 2014

(30) Foreign Application Priority Data
Jun. 2, 2011  (IN) .......................... 1568/DEL/2011

(51) Int. Cl.
*F16K 1/16*   (2006.01)
*F16K 1/226*  (2006.01)
(Continued)

(52) U.S. Cl.
CPC ............... *F16K 1/226* (2013.01); *F16K 1/221* (2013.01); *F16K 37/0066* (2013.01);
(Continued)

(58) Field of Classification Search
CPC ...... F16K 1/221; F16K 1/226; F16K 37/0066; F16K 37/0091; G01F 1/34; G01F 1/36; G01F 1/42; Y10T 137/87531; Y10T 137/7256; Y10T 137/0379; Y10T 137/0396
(Continued)

(56) References Cited

U.S. PATENT DOCUMENTS 2,390,882 A * 12/1945 Hopkins ............... F16K 31/143
                                                  192/69.62
3,682,196 A *  8/1972 Kosui .................. F16K 37/0066
                                                  137/553
(Continued)

OTHER PUBLICATIONS

International Search Report for PCT/IN2012/000388 dated Nov. 7, 2012 (2 pages).

*Primary Examiner* — Jessica Cahill
(74) *Attorney, Agent, or Firm* — Abelman, Frayne & Schwab

(57) ABSTRACT

Disclosed is a manual balancing valve having an upstream end and a downstream end, and a first equalizing ring (500a) and a second equalizing ring (500b) configured at the upstream end and the downstream end, respectively. Each of the first and the second equalizing rings comprises an annular body (505) defined between an inner peripheral edge portion (510) and an outer peripheral edge portion (515), an annular chamber (520) configured adjacent to the inner peripheral edge portion, a plurality of holes (525) configured on the inner peripheral edge portion and in fluid communication with the annular chamber, and a pressure tap (T) in fluid communication with the annular chamber and extending radially outward of the annular body. The first and the second equalizing rings are adapted to provide static pressure value at each of the upstream and the downstream ends so as to measure differential pressure therebetween and control the fluid flow rate through the valve.

11 Claims, 9 Drawing Sheets

(51) Int. Cl.
*F16K 1/22* (2006.01)
*G01F 1/34* (2006.01)
*G01F 15/00* (2006.01)
*G01F 1/36* (2006.01)
*F16K 37/00* (2006.01)

(52) U.S. Cl.
CPC ............ *F16K 37/0091* (2013.01); *G01F 1/34* (2013.01); *G01F 1/36* (2013.01); *G01F 15/001* (2013.01); *G01F 15/005* (2013.01)

(58) Field of Classification Search
USPC ........................................................ 251/305
See application file for complete search history.

(56) References Cited

U.S. PATENT DOCUMENTS

| | | | |
|---|---|---|---|
| 3,759,098 A | 9/1973 | Logsdon et al. | |
| 4,290,315 A * | 9/1981 | Grorberg | G01F 1/42 220/903 |
| 4,519,414 A | 5/1985 | Anaya | |
| 5,518,446 A * | 5/1996 | Jacob | B08B 15/023 137/486 |
| 2005/0184267 A1* | 8/2005 | Kamesawa | F16K 1/221 251/305 |
| 2007/0063157 A1* | 3/2007 | Miklo | F16K 31/602 251/101 |
| 2007/0144486 A1 | 6/2007 | Tanimura et al. | |
| 2007/0193369 A1* | 8/2007 | Evans | G01F 1/34 73/861.52 |
| 2008/0221822 A1* | 9/2008 | Laverdiere | G01F 1/34 702/100 |
| 2011/0073789 A1* | 3/2011 | Yeary | F16K 47/08 251/118 |
| 2012/0222494 A1* | 9/2012 | Wehrs | G01F 1/36 73/861.52 |

* cited by examiner

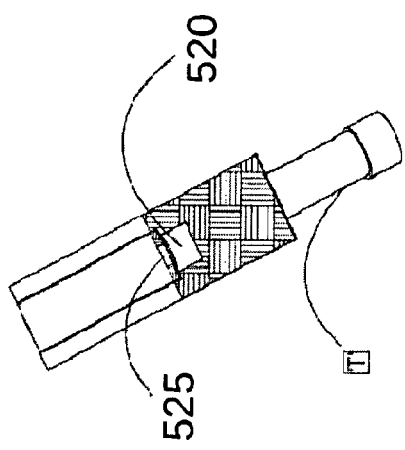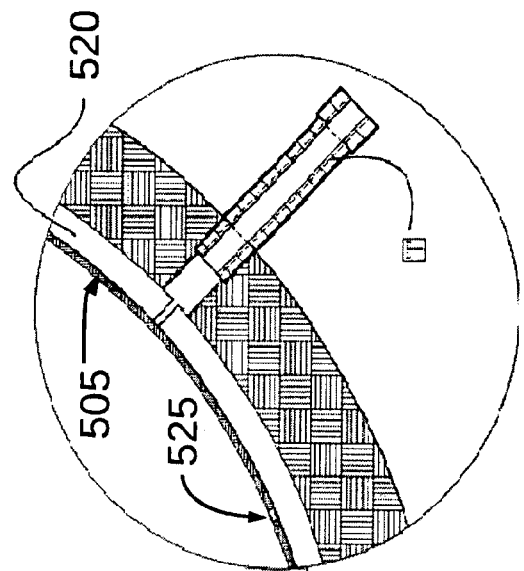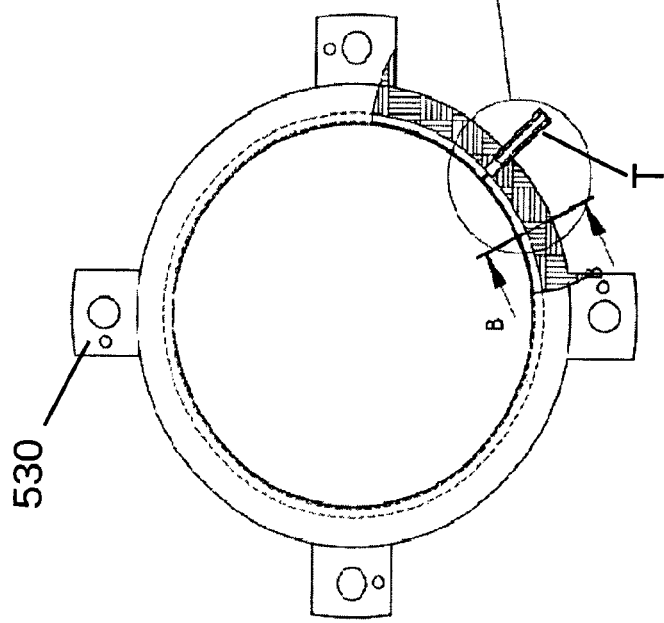

MANUAL BALANCING VALVE

RELATED APPLICATIONS

This application is a §371 of PCT/IN2012/000388 filed Jun. 4, 2012, and claims priority from Indian Patent Application No. 1568/DEL/2011 filed Jun. 2, 2011, both incorporated by reference in their entirety.

FIELD OF INVENTION

The present invention generally relates to flow control valves, and, more particularly, to manual balancing valves used in central air conditioning plants.

BACKGROUND

Manual balancing valves or double regulating valves are primarily used in central air-conditioning plants to achieve balanced distribution of cooling/heating media, i.e. chilled/hot water. These are basically throttling valves installed at each Air Handling Unit, Fan Coil Units and at all branching points so as to bring the hydronic system as close as possible to the design condition at commissioning of the plant.

A conventional manual balancing valve is either configured in a globe valve pattern (as shown in FIG. 1) or in a Y-pattern and typically includes a hand wheel for manual fine flow regulation, a differential pressure measurement device to establish flow rate and a locking arrangement to prevent tampering of valve setting. Such valves also have an arrangement to memorize/store the valve setting so that the valve can be reset to previous set values. Also, the conventional valves provide tight shut-off. Moreover, these conventional valves have a calibrated proportionality factor "Kv" with guaranteed tolerance for each and every setting of the handle.

Manual balancing valves of up to 12 inches and having the afore-mentioned features are known in the art (as shown in FIG. 1). Large size balancing valves, i.e. above 12 inches, and having the typical configuration as shown in FIG. 1 are not available since the same are not manufactured due to huge size, weight and cost involvement. Such large size balancing solutions above 12 inches generally include a butterfly/gate/ball valve "B" being used as a throttling valve and a separate flow measuring device "F" coupled in series with the said valve, as shown in FIG. 2 that illustrates a schematic diagram of arrangement used for flow control for large size pipes. It is observed that such flow measuring device "F" would require a piping of minimum 7 times the nominal diameter of valve upstream of the flow measuring device and minimum 3.5 times the nominal diameter of the valve downstream of the flow measuring device "F" to get the desired accuracy in flow measurement. Consequently, a long piping is required to install such a large size balancing valve system to achieve balancing in air conditioning plants due to which plant design becomes difficult and it is not possible to achieve proper space utilization.

Thus, the conventionally known solutions for hydronic balancing in large piping (above the size of 12 inches) suffer from many inherent disadvantages, the primary one being the requirement to have approximately 10.5 times the nominal diameter of pipeline for installation, which is generally not available on plant sites. Also, in these conventional solutions, the throttling valve and flow measurement device are separate systems, as shown in FIG. 2 for instance. Moreover, the flow measuring primary element used in such balancing solution is either a fixed nozzle or includes flow nozzle with limited flow measurement range. Another drawback of such valves is that once the valves are shut-off, re-commissioning of the plant under balanced condition at a later stage requires flow measurement and adjustment to be carried out once again. In addition, the conventional systems are capable of working only when the flow is laminar. There are no available systems that effectively work with turbulent flow as well. Thus, it shall be apparent that the conventional balancing valves are not reliable and easy to operate and use of such balancing solution involves high cost in terms of material due to requirement of long length of piping and offer a limited flow range of operation.

Accordingly, there persists a need for a large sized balancing solution which is cost effective, simple in construction, reliable and easy to use.

Further, there persists a need for a large size balancing solution that incorporates all essential features required in balancing valves but at the same time has a short face to face distance.

Furthermore, there exists a need for a large sized balancing solution which does not require a separate flow measuring device or long length pipes for installation.

Moreover, there exists a need for a large sized balancing solution which can be used for controlling flow rate for a laminar as well as turbulent fluid flow.

OBJECTS OF THE INVENTION

In view of the foregoing disadvantages inherent in the prior art, the general purpose of the present invention is to provide a large sized manual balancing valve that obviates the above and other disadvantages from existing art.

Accordingly, an object of the present invention is to provide a manual balancing valve which is cost effective, simple in construction, reliable and easy to use.

Another object of the present invention is to provide a manual balancing valve which does not require separate flow measuring device and long length pipes for installation.

Yet another object of the present invention is to provide a manual balancing valve which can be used for controlling flow rate for a laminar as well as turbulent fluid flow.

These and other objects and advantages of the invention will be clear from the ensuing description.

SUMMARY

In light of the above objects, one aspect of the present invention relates to a manual balancing valve for controlling fluid flow rate through the valve. The manual balancing valve comprises a flow control device having an axially extending fluid passage defining an upstream end and a downstream end, and a first equalizing ring and a second equalizing ring configured at the upstream end and the downstream end, respectively. Each of the first and the second equalizing rings comprise an annular body defined between an inner peripheral edge portion and an outer peripheral edge portion, an annular chamber configured adjacent to the inner peripheral edge portion, a plurality of holes configured on the inner peripheral edge portion, and a pressure tap configured in fluid communication with the annular chamber and extending radially outward of the annular body. The holes are also in fluid communication with the annular chamber and extending into the annular chamber. The first and the second equalizing rings are adapted to provide static pressure value at each of the upstream and the downstream ends for determining differential pressure across the manual balancing valve and thereby the fluid flow rate across the manual balancing valve so as to control the fluid flow rate therethrough.

In another embodiment of the present invention, the flow control device is a fluid flow control valve.

In yet another embodiment of the present invention, the fluid flow control valve is a butterfly valve comprising a valve body comprising a valve seat and a valve disc configured in the valve body. The valve disc is pivotally mounted to the valve seat with the help of a valve shaft and is adapted to rotate with the shaft so as to attain an angular orientation, relative to the valve seat, between a position substantially perpendicular to the valve seat and another position substantially parallel to the valve seat for controlling flow of fluid through the valve body. The butterfly valve also includes a gear box coupled to the valve disc. The gear box is adapted to set a value for the angular orientation of valve disc relative to the valve seat and lock the set value to prevent alteration thereof.

In still another embodiment of the present invention, the butterfly valve is a concentric butterfly valve.

In still another embodiment of the present invention, the butterfly valve is a high performance butterfly valve.

In still another embodiment of the present invention, the butterfly valve is a triple offset metal seated butterfly valve.

In still another embodiment of the present invention, the gear box comprises an enclosure having a worm gear adapted to be coupled to the valve shaft, a hand wheel coupled to a threaded worm shaft operatively coupled to the worm gear for enabling rotation thereof thereby enabling rotation of the valve shaft, an annular scale and a pointer assembly coupled to the worm gear and calibrated to depict the value for angular orientation of the valve disc, a locking mechanism coupled to the hand wheel for preventing tampering of the set value of the angular orientation of the valve disc, and a fly nut assembly adapted to set a maximum value for the angular orientation of the valve disc.

In still another embodiment of the present invention, the worm gear is coupled to the valve shaft by one or two keys inserted in respective slots in the shaft and the worm gear.

In still another embodiment of the present invention, each of the first and the second equalizing rings is coupled to the upstream end and the downstream end by attachment means (165) configured at the outer peripheral edge portion of the annular body.

Another aspect of the present invention relates to a method for controlling flow rate across a manual balancing valve. The method comprises providing a butterfly valve comprising a valve body having an axially extending fluid passage defining an upstream end and a downstream end and comprising a valve body having a valve seat and a valve disc configured in the valve body. The valve disc is pivotally mounted to the valve seat with the help of a valve shaft and adapted to rotate with the shaft so as to attain an angular orientation, relative to the valve seat, between a position substantially perpendicular to the valve seat and another position substantially parallel to the valve seat for controlling flow of fluid through the valve body. The butterfly valve also includes a gear box coupled to the valve disc. The gear box is adapted to set a value for the angular orientation of valve disc relative to the valve seat, and lock the set value to prevent alteration thereof. The method further includes configuring a first equalizing ring and a second equalizing ring at the upstream end and the downstream end, respectively, for providing static pressure value at each of the ends. Each of the first and the second equalizing rings comprises an annular body defined between an inner peripheral edge portion and an outer peripheral edge portion, an annular chamber configured adjacent to the inner peripheral edge portion, a plurality of holes configured on the inner peripheral edge portion, and a pressure tap configured in fluid communication with the annular chamber and extending radially outward of the annular body. The holes are in fluid communication with the annular chamber and extend into the annular chamber.

Also, the method includes setting the angular orientation of the valve disc to a desired value. The method further includes determining differential pressure between the upstream end and the downstream end by measuring static pressure using the first equalizing ring and the second equalizing ring. In addition, the method includes computing fluid flow rate across the valve based on the differential pressure and the angular orientation of the valve disc so as to control the fluid flow rate through the manual balancing valve. Finally the method includes manually adjusting the angular orientation of the valve disc by rotating the valve shaft until the computed fluid flow rate reaches a desired value.

In another embodiment of the present invention, configuring the each of the first and the second equalizing ring comprises providing an annular body defined between an inner peripheral edge portion and an outer peripheral edge portion, providing an annular chamber configured adjacent to the inner peripheral edge portion, providing a plurality of holes configured on the inner peripheral edge portion, and providing a pressure tap configured in fluid communication with the annular chamber and extending radially outwards of the annular body for enabling determination of static pressure. The holes are in fluid communication with the annular chamber and extending into the annular chamber.

Yet another aspect of the present invention relates to an equalizing ring adapted to enable measurement of static pressure at a pre-determined position. The equalizing ring comprises an annular body defined between an inner peripheral edge portion and an outer peripheral edge portion, an annular chamber configured adjacent to the inner peripheral edge portion, a plurality of holes configured on the inner peripheral edge portion and a pressure tap configured to be in fluid communication with the annular chamber and extending radially outward of the annular body for enabling determination of static pressure at the pre-determined position. The holes are in fluid communication with the annular chamber and extending into the annular chamber.

In another embodiment of the present invention, the equalizing ring is adapted to be coupled across a cross-section of a pipe by attachment means configured at the outer peripheral edge portion of the annular body.

These aspects together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawing and descriptive matter in which there is illustrated an exemplary embodiment of the present invention.

BRIEF DESCRIPTION OF ACCOMPANYING DRAWINGS

The advantages and features of the present invention will become better understood with reference to the following detailed description and claims taken in conjunction with the accompanying drawings, in which:

FIG. 8A illustrates a front view of the equalizing ring, shown in FIG. 7, with a portion thereof removed so as to depict the internal construction thereof.

FIG. 8B illustrates a sectional view of the equalizing ring shown in FIG. 8A along the section line B-B.

FIG. 8C illustrates an enlarged view of a portion of the equalizing ring depicted in FIG. 8A.

DETAILED DESCRIPTION OF INVENTION WITH REFERENCE TO DRAWING

The exemplary embodiments described herein detail for illustrative purposes are subject to many variations in structure and design. It should be emphasized, however, that the present invention is not limited to a particular manual balancing valve as described. It is understood that various omissions and substitutions of equivalents are contemplated as circumstances may suggest or render expedient, but these are intended to cover the application or implementation without departing from the spirit or scope of the claims of the present invention.

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element from another.

Figure 1:
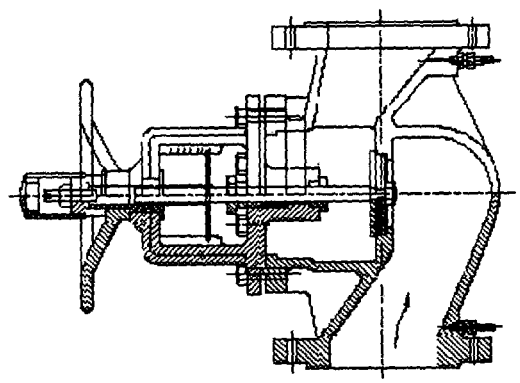
FIG. 1 illustrates a view of a typical manual balancing valves of diameter up to 12 inches, as known in the art.
Figure 2:
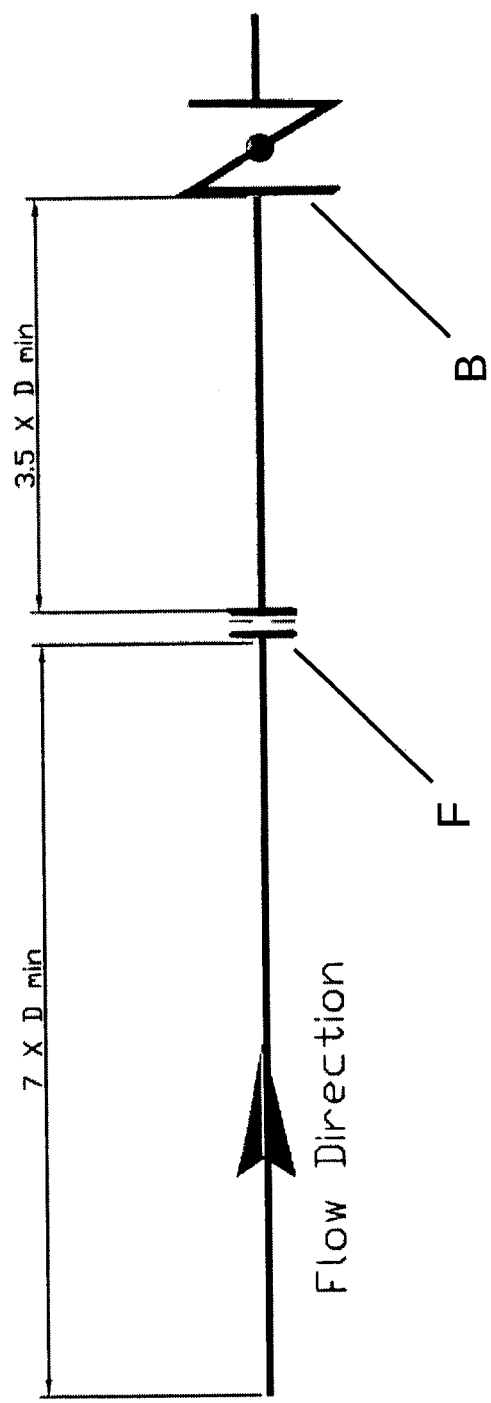
FIG. 2 illustrates a schematic diagram of a typical large sized manual balancing arrangement as known in the art.
Figure 3:
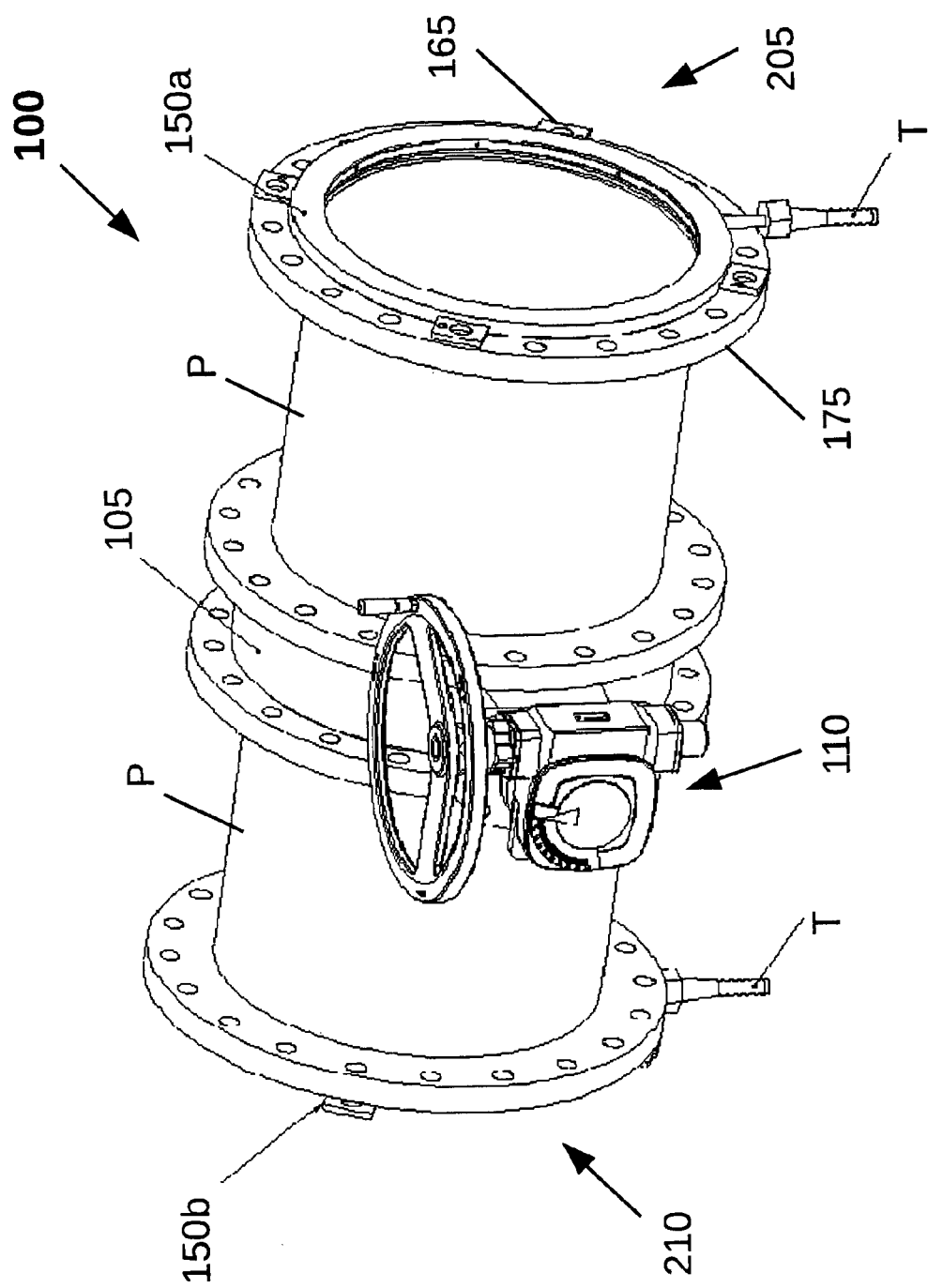
FIG. 3 illustrates a perspective view of a manual balancing valve in accordance with an embodiment of the present invention.

Reference is made to FIG. 3 that illustrates a large size manual balancing valve 100 configured in accordance with an embodiment of the present invention. In one embodiment of the present invention, the balancing valve is more than 300 mm in diameter. Further, as shown in FIG. 3, the balancing valve 100 includes a flow control device 105 having an axially extending fluid passage 'P' defining an upstream end 205 and a downstream end 210. The flow control device 105 is adapted to be used as a primary throttling device. Further, as shown in FIG. 3, the large size manual balancing valve 100 (hereinafter referred to as "balancing valve 100") also includes a first equalizing ring 150a and a second equalizing ring 150b configured at the upstream end 205 and the downstream end 210, respectively. The first and the second equalizing rings 150a, 150b are adapted to enable measurement of a value of static pressure at each of the upstream and the downstream ends 205, 210. The measured value of the static pressure at each of the upstream and the downstream ends 205, 210 is used for determining differential pressure between the two ends, the differential pressure value being consequently used for determining the fluid flow rate across the balancing valve 100 so as to control the fluid flow rate therethrough. The equalizing rings 150a and 150b shall be explained later in detail with reference to FIGS. 7, 8A and 8B.

Figure 4:
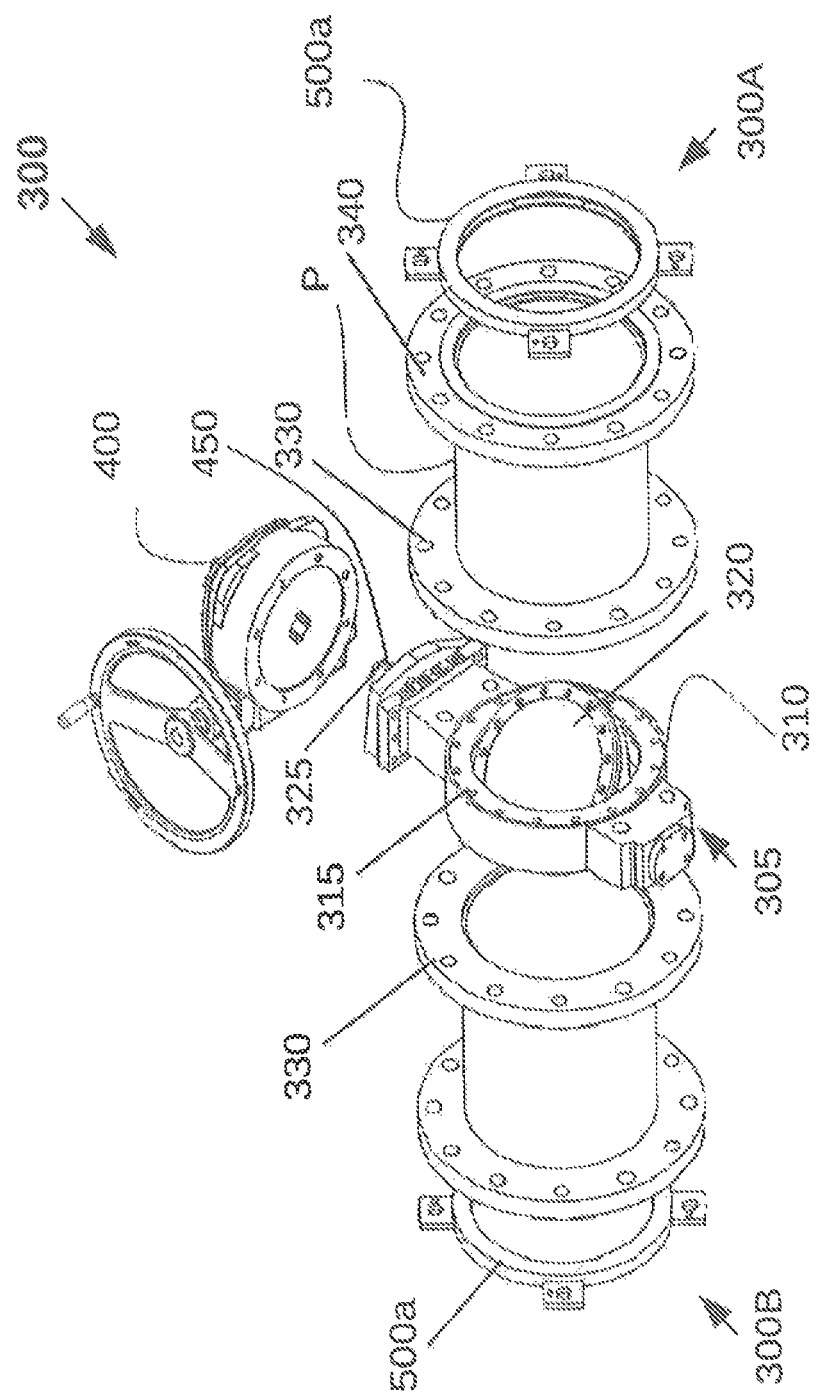
FIG. 4 illustrates an exploded view of a manual balancing valve in accordance with another embodiment of the present invention.
Figure 6:
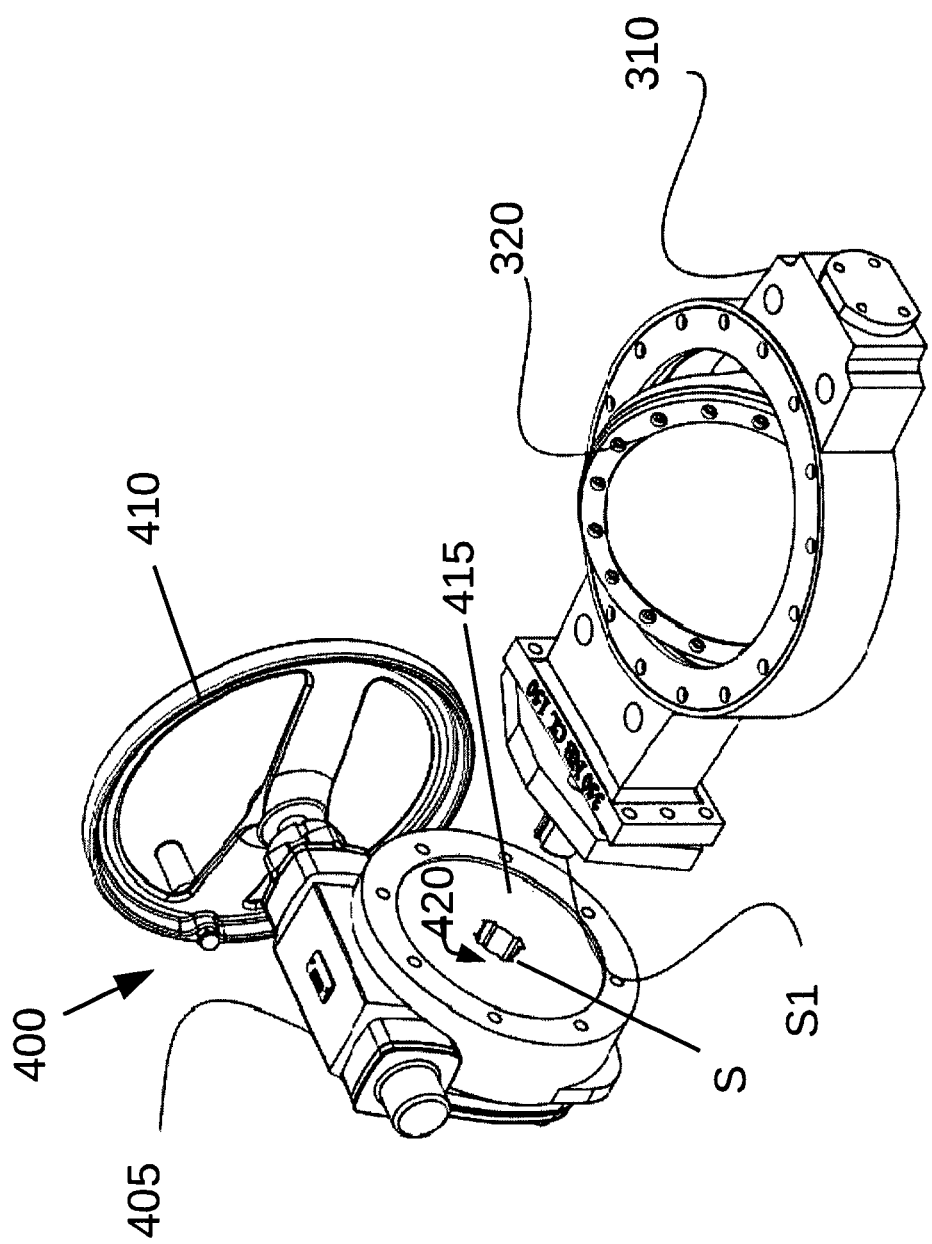
FIG. 6 illustrates an exploded view of a butterfly valve used in the manual balancing valve of FIG. 4.

Further, in an embodiment of the present invention, the flow control device 105 may be a fluid flow control valve. In another embodiment of the present invention, the fluid flow control valve may be a butterfly valve, as shown in FIG. 4. Particularly, FIG. 4 illustrates an exploded view of a balancing valve 300 configured in accordance with an embodiment of the present invention. The balancing valve 300 is similar in configuration to the balancing valve 100 except that a butterfly valve 305 has been used as the flow control device 105. The fluid passage of the butterfly valve 305 is configured by the pipes 'P'. As shown in FIG. 4, the butterfly valve 305 also includes a gear box 400. The configuration of the gear box will be explained later in conjunction with FIG. 6. As shown in FIGS. 4 and 6, the butterfly valve 305 includes a valve body 310 having a valve seat 315 and a valve disc 320 configured in the valve body 310. The valve disc 320 is pivotally mounted to the valve seat 315 with the help of a rotatable valve shaft 325 and is adapted to rotate with the shaft 325 so as to attain an angular orientation (as shown in FIGS. 4 and 6), relative to the valve seat 315. The valve disc 320 may attain an angular orientation between a position substantially perpendicular to the valve seat 315 and another position substantially parallel to the valve seat 315 for selectively controlling flow of fluid through the valve body 310. Further, the valve disc 320 has a design to maximize flow across a wide operating range, thereby providing optimum flow regulation with minimum loss of energy. In an embodiment of the present invention, the valve disc 320 may have strengthening ribs (not shown) that are configured to be substantially in the direction of the fluid flow and not against the same. Furthermore, two opposite faces of the valve seat 315 may have a plurality of threaded holes for coupling the butterfly valve 305 to flanges 330 of pipes 'P' with the help of suitable attachment means such as screws. It is to be noted that the butterfly valve 305 aids in flow control by acting as a variable orifice and enables good performance in high flow conditions and has low torque and tight shut-off capabilities.

Figure 5:
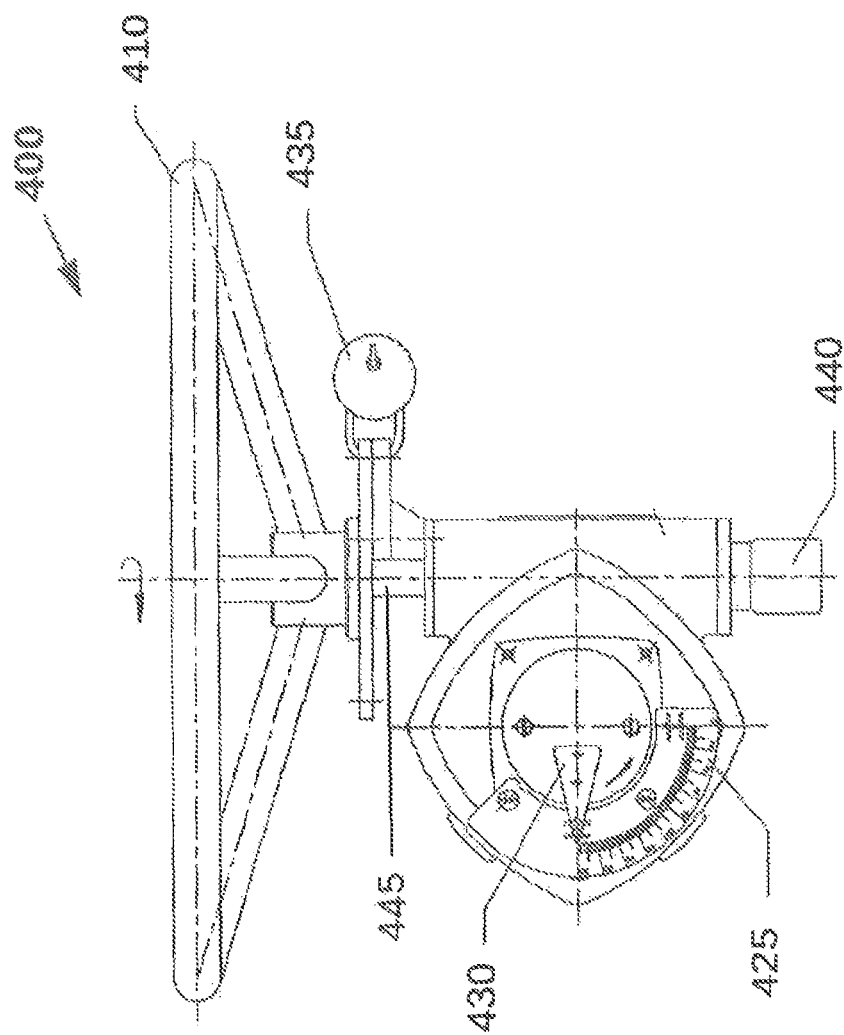
FIG. 5 illustrates a front view of a gearbox used in the manual balancing valve of FIG. 4.

The butterfly valve 305 further includes a gear box 400 (as shown in FIG. 5) with very low backlash. The gear box 400 is particularly operatively coupled to the valve disc 320 for setting a value for the angular orientation of valve disc 320 relative to the valve seat 315. The gear box 400 is also adapted to lock the set value of the angular orientation and prevent alteration thereof by any unauthorized user. The gear box 110 has been elaborately depicted in FIG. 6 and includes an enclosure 405 having a worm gear 415 (partially shown in FIG. 6) adapted to be coupled to the valve shaft 325, and a hand wheel 410 connected to a threaded worm shaft (445) operatively coupled to the worm gear 415 for enabling rotation thereof such that rotation of the valve shaft 325 is caused. Particularly, the teeth (not shown) of the worm gear 415 engage with the teeth (not shown) of the threaded worm shaft (445) connected to the hand wheel 410 such that a rotational motion of the hand wheel 410 in one plane is translated to a rotational direction of the worm gear and consequently the valve shaft 325 in a perpendicular plane. Further, the operative coupling between the gear box 400 and the valve shaft 325 is enabled by providing one or two slots 'S' in a shaft hole 420 configured in the worm gear 415 as well as corresponding slots "S1" in the valve shaft 325. A key (450) is inserted in respective slots S and S1 after the valve shaft 325 has been positioned within the shaft hole 420, thereby coupling the worm gear 415 (and consequently the gear box 400) to the valve shaft 325.

Further, FIG. 5 shows that the gear box 400 also includes an annular scale 425 fitted on to casing of worm gearbox and a pointer 430 assembly coupled to the worm gear and calibrated to depict the set value for angular orientation of the valve disc 320. A locking mechanism 435 is coupled to the hand wheel 410 for preventing tampering/alteration of the set value of the angular orientation of the valve disc by any unauthorized personnel. Thus, the balancing valve 300 is adapted to memorize the set value of the angular orientation such that a plant operator may reset the valve opening to this value without requiring flow measurements to be carried out again. In addition, the gear box 400 includes a fly nut assembly 440 adapted to set a maximum value for the angular orientation of the valve disc 320 such that the valve disc 320 cannot be opened beyond the set maximum opening angle. Thus, the gear box 400 is adapted to set the maximum opening angle beyond which the valve disc cannot be opened. Further, the gear box 400 allows the setting of the angular orientation of valve disc any where from zero (i.e. shut-off) up to the maximum set value thus remembering the angular orientation at the time of commissioning. It is to be noted that the annular scale 425 and pointer 430 assembly, the locking mechanism 435 and the fly nut assembly 440 are similar in construction to conventionally available annular scale and pointer assembly, locking mechanism and fly nut assembly, and thus a detailed description and working thereof has been avoided for sake of brevity.

It is important to note that the gear box 400 is adapted to provide accurate positioning of the valve disc 320 of the butterfly valve 305 over a wide control range and thus provides for accurate and highly granular flow regulation. In one embodiment of the present invention, the gear box 400 may be a quarter-turn worm gear box.

Figure 7:
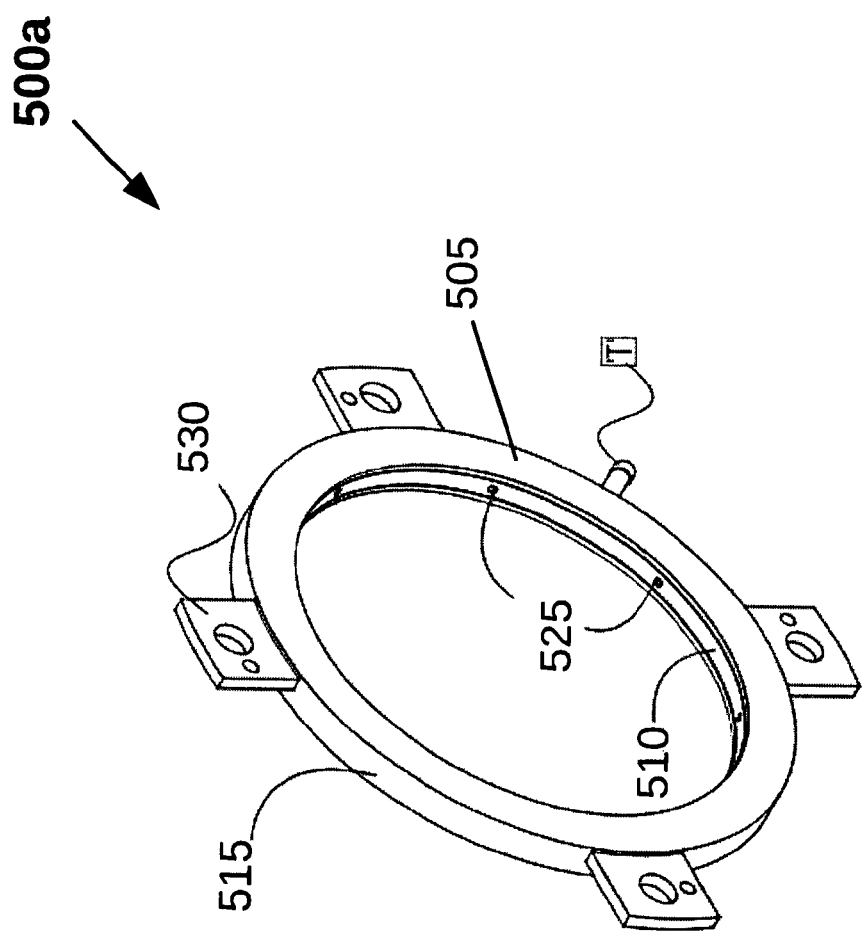
FIG. 7 illustrates a perspective view of an equalizing ring used in the manual balancing valve of FIG. 4.

Referring back to FIG. 4, the balancing valve 300 includes a first equalizing ring 500a and a second equalizing ring 500b configured at the upstream end 300A and downstream end 300B, respectively, of the balancing valve 300. The upstream end 300A is the end of the pipe 'P' on the upstream side while downstream end 300B is the end of the pipe 'P' on the downstream side of the valve 300. It is to be noted that the equalizing rings 500a and 500b are similar in configuration to the equalizing rings 150a and 150b described in conjunction with balancing valve 100. The equalizing rings 150a, 150b, 500a, 500b shall now be explained in detail with reference to FIGS. 7 and 8A-C. Particularly, FIG. 7 illustrates a perspective view of the equalizing ring 500a. It is to be noted that since all the equalizing rings are of similar construction and configuration, the detailed description of equalizing ring 500a is being provided herein and the same description shall apply to all the equalizing rings mentioned in the specification. Further, FIG. 8A illustrates a front view of the equalizing ring 500a with a portion thereof being removed so as to depict the internal construction thereof. FIG. 8B illustrates a sectional view of the equalizing ring along the section line B-B shown in FIG. 8A. Further, FIG. 8C illustrates an enlarged view of a portion of the equalizing ring 500a depicted in FIG. 8A.

As shown in FIG. 7, the equalizing ring 500a includes an annular body 505 defined between an inner peripheral edge portion 510 and an outer peripheral edge portion 515. The equalizing ring 500a further includes an annular chamber 520 (shown in FIGS. 8B and 8C) configured adjacent to the inner peripheral edge portion 510. In addition, a plurality of holes 525 are configured on the inner peripheral edge portion 510, as shown in FIGS. 7 and 8C. Particularly, the holes 525 are configured to be in fluid communication with the space enclosed by the annular chamber 520. As shown in FIGS. 8B and 8C, the hole 525 extends into the annular chamber 520. When the balancing valve 300 is in use, the fluid flowing through the fluid passage enters the annular chamber 520 through the holes 525 for equalizing static pressure, as will be explained later while explaining the working of the present invention. Further, as shown in FIGS. 7 and 8A-C, the equalizing ring 500 also includes a pressure tap T configured in fluid communication with the space enclosed by the annular chamber 520. The pressure tap T extends radially outward of the annular body 505 and is adapted to enable determination of static pressure as will be explained later while explaining the working of the balancing valve 300.

Further, as shown in FIGS. 7 and 8A, the equalizing ring 500a is provided with suitable attachment means 530 configured at the outer peripheral edge portion 515 thereof. Particularly, the attachment means 530 would enable coupling of the equalizing ring 500a to the upstream end 300A by attaching to a flange 340 (shown in FIG. 4) of the upstream pipe 'P' with the help of screws (not shown). It is to be noted that while FIGS. 4, 7 and 8A depict four attachments means 530 being configured on the equalizing ring 500a, the present invention should not be construed to be limited to this embodiment only. Any number of attachment means 530 may be provided depending upon the strength of coupling required between the equalizing ring 500a and pipe 'P'.

The present invention envisages that the equalizing rings, as described herein, are not limited to use in a manual balancing valve only and the same may be utilized for measuring static pressure in any type of fluid flow. Particularly, in an embodiment of the present invention, the equalizing rings are adapted to enable measurement of static pressure at a pre-determined position in a fluid flow. For instance, the equalizing ring may be coupled to a cross section of a pipe by means of the attachment means such that the fluid flowing through the pipe enters the equalizing rings through the plurality of holes thereof, which consequently results in equalization of pressure and helps in determining static pressure value at the particular position where the ring has been configured. Consequently, by using two equalizing rings along a flow path, the pressure differential across the flow path can be measured by taking the difference of the static pressure reading at each of the two rings.

Figure 9:
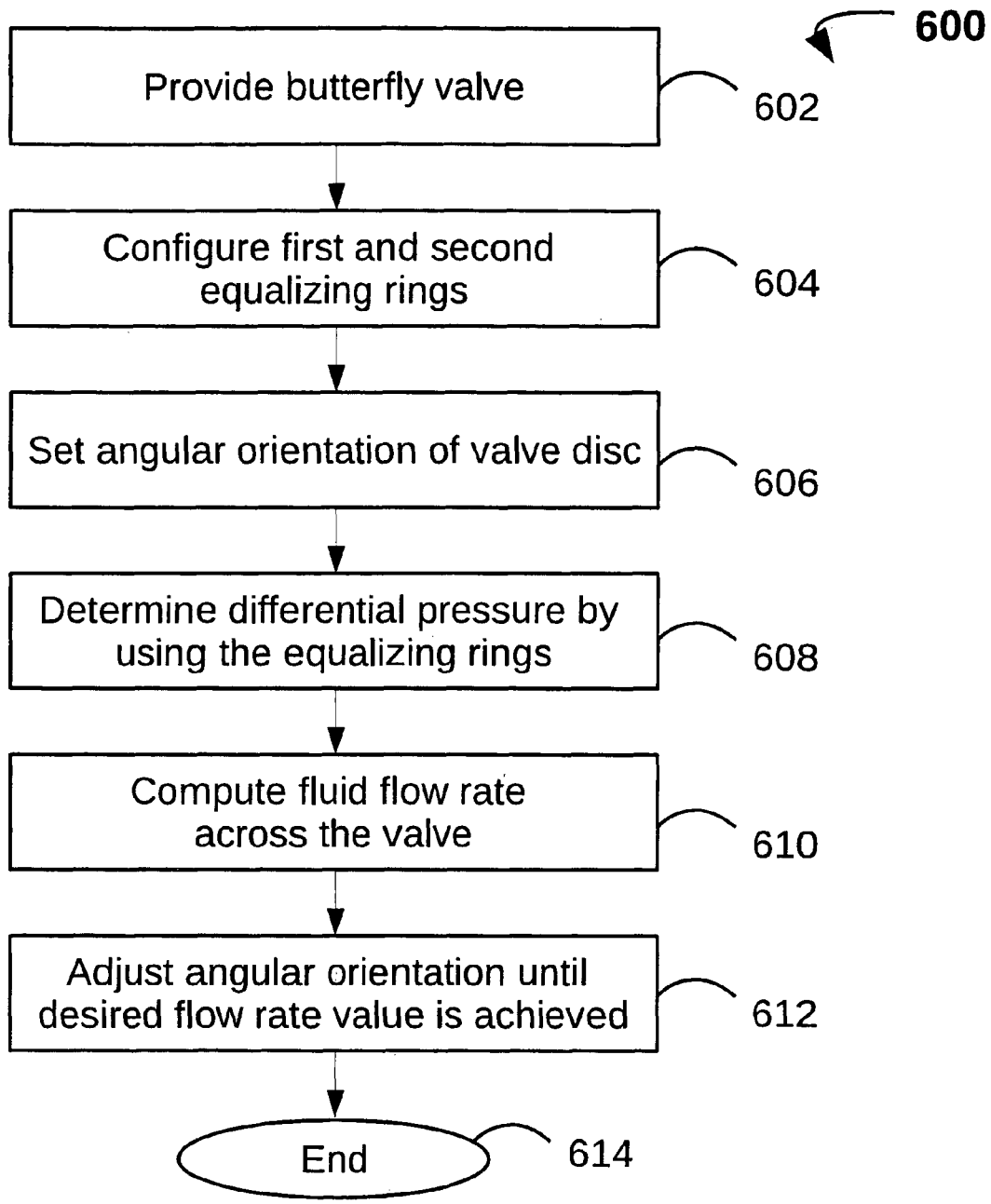
FIG. 9 illustrates a flow diagram for a method for controlling flow rate through the manual balancing valve shown in FIG. 4.

The working of the balancing valve 300 shall now be explained in conjunction with FIG. 9 which illustrates a flow diagram for a method 600 for controlling flow rate across the balancing valve 300. The method 600 commences at 602 by providing the butterfly valve 305 in the fluid flow path. As described earlier, the butterfly valve 305 includes a valve body 310 having an axially extending fluid passage 'P' defining the upstream end 300a and the downstream end 300b. The valve body 310 has a valve seat 315 and a valve disc 320 configured in the valve body 310, as already explained in conjunction with FIG. 4. Also, the butterfly valve 305 includes the gear box 400 adapted to set value for the angular orientation of the valve disc 320. Further, at 604, the method 600 includes configuring the first equalizing ring 500a and the second equalizing ring 500b at the upstream end 300A and the downstream end 300B respectively. Particularly, the first and the second equalizing rings 500a, 500b are coupled to the upstream end 300A and the downstream end 300B respectively by means of the attachment means 530, as explained earlier in conjunction with FIGS. 4, 7 and 8A-C. The balancing valve 300 is now ready for use and accordingly a fluid is allowed to flow through the valve 300 by setting the angular orientation of the valve disc 320 to a desired value, at 606 of the method 600. As explained in conjunction with FIGS. 4 and 6, the angular orientation of the valve disc 320 is set with the help of hand wheel 410 such that the annular scale 425 and pointer 430 assembly depicts the set value of the angular orientation.

Further, at 608, the differential pressure between the upstream end 300a and the downstream end 300b is determined by means of a suitable differential pressure measurement device, such as a digital differential pressure manometer. In particular, the first equalizing ring 500a and the second equalizing ring 500b are used for measuring the static pressure at the upstream end 500a and the down stream end 500b. The equalizing rings work on the principle that the fluid pressure is different along the periphery of the valve 300 depending on the angular orientation of the valve disc 320 and the angular location of the plurality of holes 525 since highly dynamic flow creates tremendous variation. The static pressures sensed at different locations get equalized in the annular chamber 520 as per Pascal's Law which states that for an incompressible fluid, in any enclosed chamber, pressure is equal at all points of the chamber. The equalized or average static pressure is tapped at the pressure tap 'T' giving the average static pressure at the upstream/downstream end or at the location where the equalizing ring has been configured. A difference between the equalized pressure tapped from the first equalizing ring 500a and the second equalizing ring 500b gives the value of differential pressure between the upstream end 300A and the downstream end 300B.

Once the differential pressure has been determined, the fluid flow rate across the balancing valve 300 is computed at 610. Particularly, the square root of the differential pressure (averaged static pressure) at the first and the second equalizing rings 500a, 500b is directly proportional to the flow through the valve 300 for a particular valve disc 320 opening (i.e. angular orientation). This proportionality factor "Kv" is determined experimentally or by using computational fluid dynamics analysis and are provided along with valve for each angular orientation of the valve disc 320. For a given value of angular orientation of the valve disc 320, the fluid flow rate through the valve 300 may be computed using the formula $$\text{FLUID FLOW RATE} = \sqrt{\text{DIFFERENTIALPRESSURE}} \times K_V \quad (1)$$

In use, the differential pressure across the upstream end 300A and downstream end 300B may be read out by connecting a digital differential pressure manometer between pressure tap 'T' of the first equalizing ring 500a and the second equalizing 5000b. Further, the angular orientation of the valve disc 320 may be read from the annular scale 425 and the pointer 430 assembly so as to determine the corresponding Kv value as provided by the valve manufacturer. The value of differential pressure and Kv may then be applied to equation (1) to compute the fluid flow rate across the valve 300.

In the event the computed fluid flow rate does not match a desired value of the fluid flow rate, the method 600 includes manually adjusting the angular orientation of the valve disc 320 (by using the hand wheel 410), at 612. Consequently, the differential pressure and the value of Kv would change, thereby changing the fluid flow rate. The method 600 concludes at 614 with the fluid flow rate attaining the desired value.

In this way, the present, invention uses uniquely configured pressure equalizing rings, before and after the butterfly valve as per one of the embodiments, to enable a stable reading of the differential pressure across the valve and hence the fluid flow rate may be easily and conveniently controlled. Also, the butterfly valve acts as a calibrated variable orifice, as due to the different angles of opening it can provide different amounts of opening in the piping and it is calibrated since it is designed to have a stable Kv at each angle of opening. The gear box due to its zero backlash design and special mating with the disc shaft enables accurate setting of the angle of opening of the disc. Hence, the combination of the high accuracy gear box, the calibrated disc and the equalizing rings that allow stable flow measurement across the valve in a small length of pipe, helps in providing a large size balancing valve solution that provides flow regulation, flow measurement, position memory, high range of permitted flow and a cost effective and easy to handle design within a face-to-face that is less than 3 times the diameter of the pipe across which the balancing is to be done.

From the foregoing description, it shall be evident that the balancing valve, as described herein, is adapted to include all essential features of a conventional balancing valve along with additional features that help the same in addressing the inherent problems of conventional valves. Particularly, consequent to the use of the unique equalizing rings, the total face to face distance of the large size balancing valve of the present invention is maintained equivalent to nominal size for a globe valve. Further, unlike the conventional large size balancing valves, which require minimum 10.5 times the nominal diameter of pipe, the balancing valve of the present invention requires less than 3 times the diameter of the pipe, thereby reducing material cost substantially. Moreover, the balancing valve, as described herein, is adapted to be installed in any orientation, such as horizontal, vertical, slanting and the like which helps in providing flexibility in terms of orientation of valve with respect to pipe line axis as well as flexibility in orientation of pressure tapping points for easy differential pressure measurement at plant site. In addition, the balancing valves of the present invention enable setting of the valve to achieve flow setting accuracy within ±7%.

Moreover, unlike conventional balancing valves, in one embodiment the valve shaft in the balancing valve is connected to the gearbox through two keys instead of one. Consequently, the pressure borne by the keys is distributed, thereby reducing the likelihood of play or backlash being introduced over a long usage. Further, the balancing valve, as described herein, includes a variable orifice for flow measurement, thereby giving much higher flow measurement range than the fixed orifice systems used in conventional solutions. Furthermore, the flow regulation in the balancing valve of the present invention is much more precise that in conventional solutions since it enables 50 step regulation in a quarter turn valve with precise Kv value for each of the Kv steps. Also, in view of the option of locking the set value of valve opening, the balancing valve of the present invention can be easily reset to the same position in the event it is required to be re-commissioned after the use of the valve was suspended for a while, such as during plant maintenance. In addition, the balancing valve, as described herein, is suitable for flow control for laminar as well as turbulent flow unlike conventional systems which can perform flow control only when the flow is laminar.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. For instance, in an embodiment of the present invention, the butterfly valve 105 may be a concentric butterfly valve. In another embodiment of the present invention, the butterfly valve 105 may be a high performance butterfly valve. In yet another embodiment of the present invention, the butterfly valve may be a triple offset metal seated butterfly valve.

The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present invention.

We claim:

1. A manual balancing valve for controlling fluid flow rate through the valve, the manual balancing valve comprising: a butterfly valve having
    a valve body with a valve seat and a valve disc situated in the valve body, the valve disc being pivotally mounted to the valve seat with a valve shaft and being adapted to rotate with the shaft so as to attain an angular orientation, relative to the valve seat, between a position substantially perpendicular to the valve seat and another position substantially parallel to the valve seat for controlling flow of fluid through the valve body; and
    a gear box coupled to the valve disc, the gear box being adapted to set a value for the angular orientation of valve disc relative to the valve seat and lock the set value, to prevent alteration thereof,
        said gear box comprising an enclosure having a worm gear adapted to be coupled to the valve shaft, a hand wheel coupled to a threaded worm shaft operatively coupled to the worm gear for enabling rotation thereof enabling rotation of the valve shaft, an annular scale and a pointer assembly coupled to the worm gear and calibrated to depict the value for angular orientation of the valve disc, a locking mechanism coupled to the hand wheel for preventing tampering of the set value of the angular orientation of the valve disc, and a fly nut assembly adapted to set a maximum value for the angular orientation of the valve disc, the worm gear being coupled to the valve shaft by one or two keys inserted in respective slots in the shaft and the worm gear,
    said butterfly valve having an axially extending fluid passage defining an upstream end and a downstream end; and a first equalizing ring and a second equalizing ring situated at the upstream end and the downstream end, respectively, each of the first and the second equalizing rings comprising an annular body defined between an inner peripheral edge portion and an outer peripheral edge portion, an annular chamber situated adjacent to the inner peripheral edge portion, a plurality of holes extending radially inward through said inner peripheral edge and in fluid communication with the annular chamber and extending into the annular chamber, and a pressure tap configured in fluid communication with the annular chamber and extending radially outward of the annular body,
    wherein the first and the second equalizing rings are adapted to provide static pressure value at each of the upstream and the downstream ends for determining differential pressure across the manual balancing valve and thereby the fluid flow rate across the manual balancing valve so as to control the fluid flow rate therethrough.

2. A method for controlling flow rate across a manual balancing valve, the method comprising: providing a butterfly valve comprising a valve body having an axially extending fluid passage defining an upstream end and a downstream end and comprising a valve body having a valve seat and a valve disc configured in the valve body, the valve disc being pivotally mounted to the valve seat with the help of a valve shaft and adapted to rotate with the shaft so as to attain an angular orientation, relative to the valve seat, between a position substantially perpendicular to the valve seat and another position substantially parallel to the valve seat for controlling flow of fluid through the valve body, and a gear box coupled to the valve disc, the gear box being adapted to set a value for the angular orientation of valve disc relative to the valve seat, and lock the set value to prevent alteration thereof; configuring a first equalizing ring and a second equalizing ring at the upstream end and the downstream end, respectively, for providing static pressure value at each of the ends, each of the first and the second equalizing rings comprising an annular body defined between an inner peripheral edge portion and an outer peripheral edge portion, an annular chamber configured adjacent to the inner peripheral edge portion, a plurality of holes configured on the inner peripheral edge portion, the holes being in fluid communication with the annular chamber and extending into the annular chamber, and a pressure tap configured in fluid communication with the annular chamber and extending radially outward of the annular body; setting the angular orientation of the valve disc to a desired value; determining differential pressure between the upstream end and the downstream end by measuring static pressure using the first equalizing ring and the second equalizing ring; computing fluid flow rate across the valve based on the differential pressure and the angular orientation of the valve disc so as to control the fluid flow rate through the manual balancing valve; and manually adjusting the angular orientation of the valve disc by rotating the valve shaft until the computed fluid flow rate reaches a desired value.

3. A manual balancing valve for controlling fluid flow rate through the valve, comprising: a conduit with upstream and downstream ends, having an axially extending fluid passage in said conduit; and axially spaced a first equalizing ring and a second equalizing ring situated at the upstream end and the downstream end, respectively, each of the first and the second equalizing rings comprising an annular body defined between an inner peripheral edge portion and an outer peripheral edge portion, an annular chamber configured adjacent to the inner peripheral edge portion, a plurality of holes configured on the inner peripheral edge portion, the holes being in fluid communication with the annular chamber and extending into the annular chamber, and a pressure tap configured in fluid communication with the annular chamber and extending radially outward of the annular body, and a manual control valve intermediate said equalizing rings, wherein the first and the second equalizing rings are adapted to provide static pressure value at each of the upstream and the downstream ends for determining differential pressure across the manual balancing valve, and said manual control valve is adapted to vary the fluid flow rate across the manual balancing valve so as to control the fluid flow rate therethrough.

4. The manual balancing valve as claimed in claim 3, wherein each of the first and the second equalizing rings is coupled to the upstream end and the downstream end by attachment means configured at the outer peripheral edge portion of the annular body.

5. The manual balancing valve as claimed in claim 3, wherein the fluid flow control valve is a butterfly valve comprising: a valve body comprising a valve seat and a valve disc configured in the valve body, the valve disc being pivotally mounted to the valve seat and being adapted to rotate with the shaft so as to attain an angular orientation, relative to the valve seat, between a position substantially perpendicular to the valve seat and another position substantially parallel to the valve seat for controlling flow of fluid through the valve body, and a gear box coupled to the valve disc, the gear box being adapted to set a value for the angular orientation of valve disc relative to the valve seat and lock the set value, to prevent alteration thereof.

6. The manual balancing valve as claimed in claim 5, wherein the butterfly valve is a concentric butterfly valve.

7. The manual balancing valve as claimed in claim 6 further comprising a gear box adapted to set a value for the angular orientation of valve disc relative to the valve seat and lock the set value to prevent alteration thereof, wherein the gear box comprises an enclosure having a worm gear adapted to be coupled to the valve shaft, a hand wheel coupled to a threaded worm shaft operatively coupled to the worm gear for enabling rotation thereof thereby enabling rotation of the valve shaft, an annular scale and a pointer assembly coupled to the worm gear and calibrated to depict the value for angular orientation of the valve disc, a locking mechanism coupled to the hand wheel for preventing tampering of the set value of the angular orientation of the valve disc, and a fly nut assembly adapted to set a maximum value for the angular orientation of the valve disc.

8. The manual balancing valve as claimed in claim 5, wherein the butterfly valve is a triple offset metal seated butterfly valve.

9. The manual balancing valve as claimed in claim 8 further comprising a gear box adapted to set a value for the angular orientation of valve disc relative to the valve seat and lock the set value to prevent alteration thereof, wherein the gear box comprises an enclosure having a worm gear adapted to be coupled to the valve shaft, a hand wheel coupled to a threaded worm shaft operatively coupled to the worm gear for enabling rotation thereof thereby enabling rotation of the valve shaft, an annular scale and a pointer assembly coupled to the worm gear and calibrated to depict the value for angular orientation of the valve disc, a locking mechanism coupled to the hand wheel for preventing tampering of the set value of the angular orientation of the valve disc, and a fly nut assembly adapted to set a maximum value for the angular orientation of the valve disc.

10. The manual balancing valve as claimed in claim 5, wherein the gear box comprises an enclosure having a worm gear adapted to be coupled to the valve shaft, a hand wheel coupled to a threaded worm shaft operatively coupled to the worm gear for enabling rotation thereof thereby enabling rotation of the valve shaft, an annular scale and a pointer assembly coupled to the worm gear and calibrated to depict the value for angular orientation of the valve disc, a locking mechanism coupled to the hand wheel for preventing tampering of the set value of the angular orientation of the valve disc, and a fly nut assembly adapted to set a maximum value for the angular orientation of the valve disc.

11. The manual balancing valve as claimed in claim 10, wherein the worm gear is coupled to the valve shaft by one or two keys inserted in respective slots in the shaft and the worm gear.

* * * * *